US012750425B2

(12) United States Patent
Onno et al.

(10) Patent No.: US 12,750,425 B2
(45) Date of Patent: Sep. 29, 2026

(54) AI/ML MODEL DISTRIBUTION BASED ON NETWORK MANIFEST

(71) Applicant: InterDigital Patent Holdings, Inc., Wilmington, DE (US)

(72) Inventors: Stephane Onno, Cesson-Sevigne (FR); Cyril Quinquis, Cesson-Sevigne (FR); Thierry Filoche, Cesson-Sevigne (FR)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 327 days.

(21) Appl. No.: 18/286,402

(22) PCT Filed: Apr. 19, 2022

(86) PCT No.: PCT/EP2022/060212

§ 371 (c)(1),
(2) Date: Oct. 11, 2023

(87) PCT Pub. No.: WO2022/223499

PCT Pub. Date: Oct. 27, 2022

(65) Prior Publication Data

US 2024/0187959 A1 Jun. 6, 2024

(30) Foreign Application Priority Data

Apr. 20, 2021 (EP) .................................... 21305521

(51) Int. Cl.
*H04L 67/00* (2022.01)
*G06N 20/00* (2019.01)
(Continued)

(52) U.S. Cl.
CPC ............. *H04L 67/34* (2013.01); *G06N 20/00* (2019.01); *H04L 41/16* (2013.01); *H04L 65/75* (2022.05)

(58) Field of Classification Search
CPC .................. H04L 67/00–756; G06N 20/00–20
See application file for complete search history.

(56) References Cited

U.S. PATENT DOCUMENTS 9,037,638 B1 * 5/2015 Lepeska .................. H04L 67/00 709/203
10,827,181 B1 * 11/2020 Sen ...................... H04N 19/179
(Continued)

FOREIGN PATENT DOCUMENTS

JP 2019515523 A 6/2019
WO 2020067592 A1 4/2020

OTHER PUBLICATIONS

Anonymous, 3rd Generation Partnership Project; Technical Specification Group Services and System Aspects; Study on traffic characteristics and performance requirements for AI/ML model transfer in 5GS (Release 18), 3GPP TR 22.874 v1.0.0, Mar. 2021, 103 pages.
Third Generation Partnership Project, "Technical Specification Group Services and System Aspects; Proximity-based services (ProSe); Stage 2 (Release 16)," 3GPP TS 23.303 V16.0.0 (Jul. 2020), 130 pages.

*Primary Examiner* — Brendan Y Higa
(74) *Attorney, Agent, or Firm* — VOLPE KOENIG

(57) ABSTRACT

In one implementation, a manifest application server provides to a UE a description text file, called "manifest." which indicates several network communication paths to download or update a particular AI/ML model adapted to the target UE capabilities. The AI/ML model is supposed to be split into chunks. The manifest file is centralized and controlled by the manifest application server for delivering the best overall network efficiency with respect to different types of UEs in the system. The manifest file includes device to device communication paths and relevant information (bandwidth, chunk IDs, etc.) provided by the UE themselves. The manifest application server publishes a set of different manifests describing different network communication paths
(Continued)

and related expected network limitations for downloading particular model chunks.

20 Claims, 12 Drawing Sheets

(51) Int. Cl.
*H04L 41/16* (2022.01)
*H04L 65/75* (2022.01)

(56) References Cited

U.S. PATENT DOCUMENTS

| | | | | |
|---|---|---|---|---|
| 2011/0255535 | A1* | 10/2011 | Tinsman | G06F 15/17318 370/401 |
| 2012/0030723 | A1* | 2/2012 | Baum | H04N 21/234327 725/105 |
| 2014/0115724 | A1* | 4/2014 | van Brandenburg | H04L 63/0807 726/30 |
| 2015/0207846 | A1* | 7/2015 | Famaey | H04L 67/563 709/219 |
| 2017/0118263 | A1* | 4/2017 | Crabtree | H04L 65/611 |
| 2017/0264682 | A1 | 9/2017 | Eagle et al. | |
| 2019/0182302 | A1 | 6/2019 | Gordon | |
| 2020/0265493 | A1* | 8/2020 | Kumar Addepalli | G06Q 30/0619 |
| 2020/0336524 | A1* | 10/2020 | Tinsman | H04L 65/765 |
| 2021/0409789 | A1* | 12/2021 | Han | G06N 3/045 |
| 2022/0283820 | A1* | 9/2022 | Pudipeddi | G06N 3/09 |
| 2024/0357332 | A1* | 10/2024 | Quinquis | H04L 67/06 |

* cited by examiner

General information: xxx
Chunk Information
chunk m0: Server 1: Unicast, addr "a.b.c.d", expected: 10 ms
chunk m0: Server 2: multicast, addr "224.x.y.z", expected: 15 ms
chunk m1,2: Server 1: Unicast, addr "a.b.c.d", expected: 40 ms
chunk m1,2: Server 2: multicast, addr "224.x.y.z", expected: 15 ms
...

FIG. 4

General information: xxx
Chunk Information
chunk m0: Server 1: Unicast, addr "a.b.c.d", expected: 35 ms
chunk m0: Server 2: multicast, addr "224.x.y.z", expected: 15 ms
chunk m0: UE1: D2D, addr "192.168.1.X", expected: 1 ms
chunk m1,2: Server 1: Unicast, addr "a.b.c.d", expected: 45 ms
chunk m1,2: Server 2: multicast, addr "224.x.y.z", expected: 8 ms
chunk m1,2: UE1: D2D, addr "192.168.1.X", expected: 2 ms
chunk m1,2: UE4: D2D, addr "192.168.1.X", expected: 2 ms
...

FIG. 5

AI/ML MODEL DISTRIBUTION BASED ON NETWORK MANIFEST

CROSS REFERENCE TO RELATED APPLICATIONS

This application is a U.S. National Stage Application under 35 U.S.C. 371 of International Patent Application No. PCT/EP2022/060212, filed Apr. 19, 2022, which is incorporated herein by reference in its entirety.

This application claims the benefit of European Patent Application No. EP21305521.3 filed Apr. 20, 2021, which is incorporated herein by reference in its entirety.

TECHNICAL FIELD

The present embodiments generally relate to distribution of AI/ML (Artificial Intelligence/Machine Learning) models.

BACKGROUND

The AI/ML techniques can be used in various domains, such as image enhancement, audio noise reduction, automatic translation, and navigation. This new intelligence can be accomplished by processing and interpreting precisely and quickly a tremendous amount of data generated by sensors embedded in the devices, e.g., camera, microphone, and thermometer. These sensors aim at reflecting what happens in the close vicinity of the device. Thus, environment change will impact the final application and the user experience.

SUMMARY

According to an embodiment, a method performed by a wireless transmit/receive unit (WTRU) is presented, comprising: receiving information indicating a plurality of network communication paths that are available for downloading an AI/ML model, wherein said information further includes AI/ML model information: determining a plurality of AI/ML model chunks for said AI/ML model based on said received information: determining one network communication path, from said plurality of communication network paths, to download a respective model chunk of said plurality of AI/ML model chunks of said AI/ML model, based on said received information: establishing communication with said one network communication path to download said respective model chunk of said AI/ML model: building at least a subset of said AI/ML model based on said respective model chunk of said AI/ML model: and performing inference on said at least a subset of said AI/ML model.

According to another embodiment, a method performed by a server is presented, comprising: receiving model subscription information from a wireless transmit/receive unit (WTRU): selecting an AI/ML model for an event based on said model subscription information, said AI/ML model including a plurality of model chunks: generating information indicating a plurality of network communication paths that are available for downloading respective model chunks of said plurality of model chunks of said AI/ML model, based on said model subscription information: and transmitting said generated information to said WTRU.

Further embodiments include systems configured to perform the methods described herein. Such systems may include a processor and a non-transitory computer storage medium storing instructions that are operative, when executed on the processor, to perform the methods described herein.

BRIEF DESCRIPTION OF THE DRAWINGS

FIG. 4 and FIG. 5 illustrate examples of manifest information for UE1 and UE2, according to an embodiment.

DETAILED DESCRIPTION

Figure 1A:
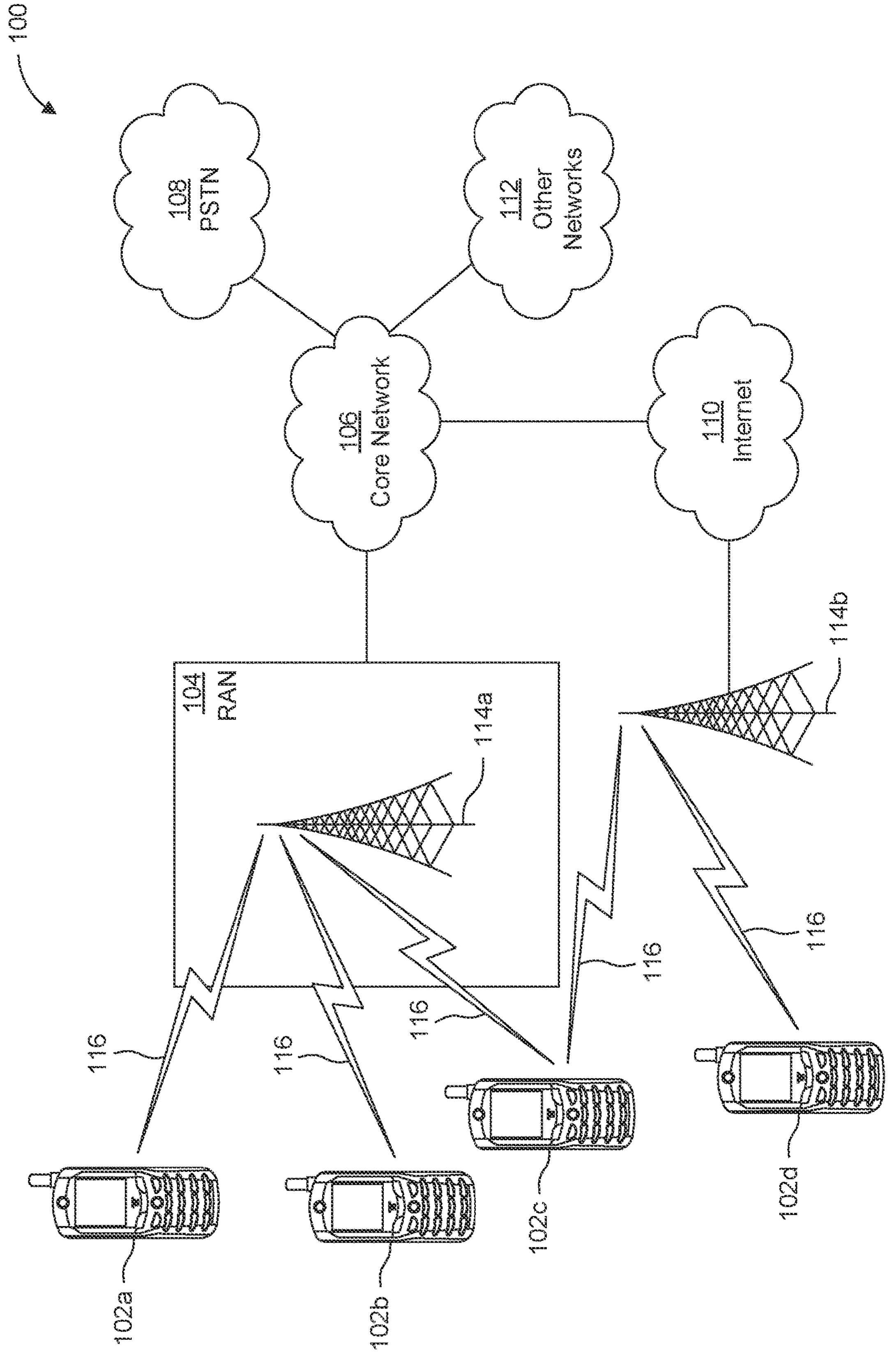
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a “station” and/or a “STA”, may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*. 102*b*. 102*c* may implement multiple radio access technologies. For example, the base station 114*a* and the WTRUs 102*a*. 102*b*. 102*c* may implement LTE radio access and NR radio access together, for instance using dual connectivity (DC) principles. Thus, the air interface utilized by WTRUs 102*a*. 102*b*. 102*c* may be characterized by multiple types of radio access technologies and/or transmissions sent to/from multiple types of base stations (e.g., a eNB and a gNB).

In other embodiments, the base station 114*a* and the WTRUs 102*a*. 102*b*. 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856). Global System for Mobile communications (GSM). Enhanced Data rates for GSM Evolution (EDGE), GSM EDGE (GERAN), and the like.

The base station 114*b* in FIG. 1A may be a wireless router, Home Node B. Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*. 102*d* may implement a radio technology such as IEEE 802.11 to establish a wireless local area network (WLAN). In an embodiment, the base station 114*b* and the WTRUs 102*c*. 102*d* may implement a radio technology such as IEEE 802.15 to establish a wireless personal area network (WPAN). In yet another embodiment, the base station 114*b* and the WTRUs 102*c*. 102*d* may utilize a cellular-based RAT (e.g., WCDMA. CDMA2000. GSM. LTE. LTE-A. LTE-A Pro. NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VOIP) services to one or more of the WTRUs 102*a*. 102*b*. 102*c*. 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling. Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
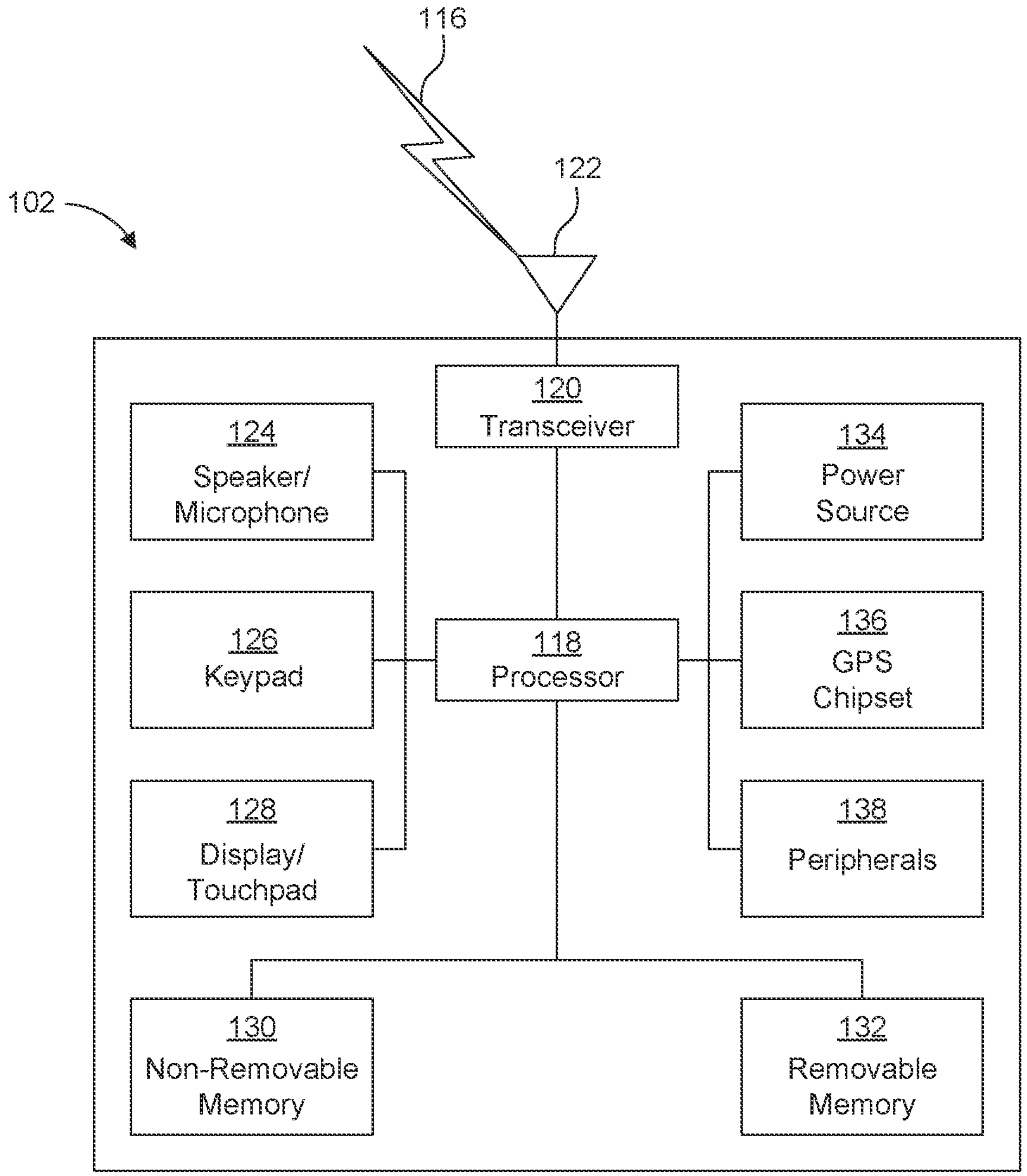
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth R: module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor: a geolocation sensor: an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Although the WTRU is described in FIGS. 1A-1B as a wireless terminal, it is contemplated that in certain representative embodiments that such a terminal may use (e.g., temporarily or permanently) wired communication interfaces with the communication network.

In view of FIGS. 1A-1B, and the corresponding description of FIGS. 1A-1B, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A deep neural network (DNN) is a complex function mapping some input domain to another domain, the output. A DNN is composed of several neural layers (typically in series) and each neural layer is composed of several perceptrons. A perceptron is a function that consists of a linear combination of the inputs and a non-linear function, for example a sigmoid function. Therefore, a DNN is composed of two elements: the architecture, which includes the number of perceptrons and the connections between them, and the parameters, which are the weights of the linear functions and, if required, the parameters of the non-linear functions. Trained by a machine learning (ML) algorithm on huge data sets, these models have recently proven useful for a wide range of applications and have led to significant improvements to the state-of-the-art in artificial intelligence (AI), computer vision, audio processing and several other domains. Due to their prevalence today, they are often referred to as an "AI/ML model".

An AI/ML model consists basically in a set of weights that are learned during training for a specific architecture or configuration, where the architecture or configuration specifies what layers the model contain, and how they are connected.

It is expected that many of the applications installed on the mobile devices will rely on AI/ML algorithms. In order to maintain or even improve the user experience, the AI/ML model that the application relies on may be first downloaded or updated. This download or update process shall be fast and efficient and shall not hamper the application.

Mobile Network Operators and Content Providers face many challenges, for example:

Make the AI/ML models available everywhere at any time for the maximum number of requesters.

Provide an AI/ML model portfolio that encompasses a large diversity of mobile devices.

Maintain the quality of service and avoid network congestion caused by simultaneous downloads of super-sized AI/ML models.

Mobile applications in 4G/5G/6G context will rely more and more on AI/ML models that will be downloaded onto end user devices over wireless networks. A recent study on AI/ML Model Transfer in 5GS in 3GPP SAI (TR22.874) proposes use-cases and defines high level requirements on this subject. As an example, during a social event, e.g., a concert or a car race, thousands of people use an application on their smartphones that require AI/ML models. These AI/ML models are specific to the event area, specific to the social event itself, and may evolve during the social event itself with some environment changes like light or sounds. AI/ML models have to be downloaded first.

When the event starts, thousands of people launch the application, which triggers thousands of downloads of the same AI/ML models. As each AI/ML model is of several hundreds of Mbytes, this generates a tremendous downlink traffic, which is very difficult to handle by the base station, and the AI/ML model server, in a very short period of time. As the available spectrum resources are limited, this will lead to a limited throughput and possible congestion issues and delays, also as a consequence a poor QoE for the end user.

Table 1 illustrates potential AI/ML models available during the social event.

TABLE 1

Illustration of AI/ML models adapted to the social event moment

| When | Scene/ EventID | AI/ML Model IDs | Model interest |
|---|---|---|---|
| People enter the event area | Scene_0 | E00_A, E00_V, E00_P | Adaptation to the specific acoustic and light of the event area |
| Band enters the area | Scene_1 | E50_A, E50_V, E50_P | Adaptation to the specific acoustic and light of the band in this event area |
| Band plays energic music | Scene_2 | E51_A, E51_V, E51_P | Adaptation to the specific acoustic and light of the band in this event area for some songs |
| Band plays calm music | Scene_3 | E52_A, E52_V, E52_P | Adaptation to the specific acoustic and light of the band in this event area for some songs |
| At anytime | All scenes | AT_Cancel_echo | Remove some bad sound echo due to default acoustic of this event area |
| At anytime | All scenes | AT_SHR | Super High Resolution model that improves picture or video from HD to 4K |
| At anytime | All scenes | AT_LIGHT_IMPROVER | Management of light variation to improve picture during this event |
| At anytime | All scenes | AT_Audio_noise_cleaner | Improve noise cancellation |
| At anytime | All scenes | AT_Sound_equalizer | Improve audio balance for UE located in the far right or far left of the scene |
| At anytime | All scenes | AT_ArtistInfo | Artist face recognition |
| At anytime | All scenes | AT_MusicMaterialInfo | Musical equipment identification |

Using the first row of Table 1 as an example, Table 1 can be read as: when people, therefore UEs, enter the concert hall (referenced as the first "scene" scene_0), of the event, UEs can collect some specific AI/ML models dedicated to this concert hall acoustic and other characteristics (E00_A is a model specialized for the audio of the concert hall, E00_V is a model specialized for the video of the concert hall, E00_P is a model specialized to take picture in this concert hall).

If we consider an average model size of 64 KB, and if 5000 UEs ask for the same model (e.g., E00_A), and want to use it within a second, it requires a downlink bitrate of 64 KB*8*5000=2.56 Gb/s.

This application provides methods for a UE to collect a manifest (e.g., a description text file) of different network communication paths to download and further update a particular AI/ML model adapted to the target UE capabilities. The network paths are centralized and controlled by an application server for delivering the best overall network efficiency with respect to different kinds of UEs in place. The AI/ML model is supposed to be split into chunks. A chunk is sub-set of an AI/ML model and consists of a set of weights values. As a result, the AI/ML Application server/manifest server will publish a set of different manifests describing different network communication paths and related expected network limitations for downloading particular model chunks.

A network communication path may be a local link, for example, direct communication from a neighbor leading UE providing streaming capabilities to their vicinity, or a distant link, for example, communication between a UE and a remote AI/ML server located in the cloud, at the edge or in the Core Network. For either a local link or distant link, one-to-one unicast communication between a UE and an AI/ML server, or one-to-many communication can be used. The one-to-many communication may use broadcast, groupcast, multicast (e.g., multicast carousels streaming AI/ML model chunks according to various chunk frequencies). The communication pattern may be request/response or subscribe/notify. For regular update, a callback or notification is required. For the rest of the application, we use the terminology "multicast" to refer to the one-to-many communication, which may be multicast, groupcast, or broadcast.

To include direct network paths as a source for neighbor download, a so-called leading UE capable of redistributing model chunks to neighbor will register and further update its capabilities to the AI/ML server. In addition, it may consider the adjustment of the chunk frequency distribution of a multicast carousel considering the amount of requests, i.e., more requests would increase the chunk frequency.

Advantageously, this application discloses methods to maintain the quality of service and avoid network congestion caused by the simultaneous downloads of super-sized AI/ML models by a huge number of users. The proposed methods may save BSS (Base Station System) spectrum resources, reduce load on the AI/ML model server, reduce AI/ML model download time, and improve User Experience.

Figure 2:
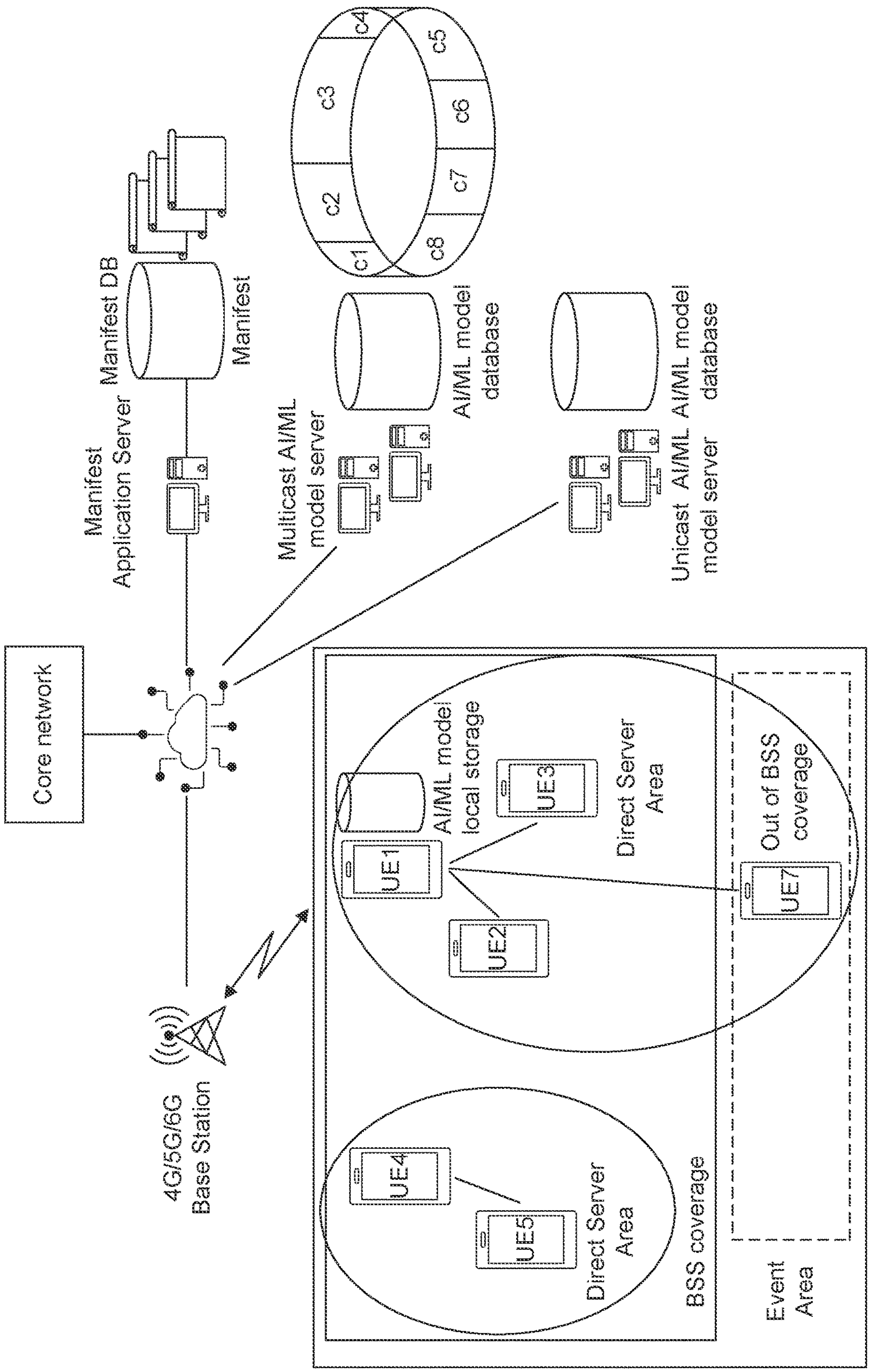
FIG. 2 illustrates an overview of a system for distributing AI/ML models based on network manifest, according to an embodiment.

FIG. 2 illustrates a setting where potentially a large set of UEs want to download an AI/ML model from an AI/ML model server. The UEs are located in a close vicinity in the same limited area where the network resources are limited in regards to the amount of UEs requesting the AI/ML application data. The manifest application server, multicast AI/ML model server, unicast AI/ML model server can be beside/co-located with the Base Station, in the edge, in the core network, or behind the core network.

The "Event Area" is the area where the social event takes place, for example, a concert hall. This area is considered as static during the event. It is assumed that some specific AI/ML models have been developed and trained for this specific event area. During the event the environment may change, for example, at some moments the light environment or sound environment may change.

The "Direct Server Area" is the area where devices are close enough to make a Device to Device (D2D) exchange.

This area is largely dynamic and evolves over time due to the movement of people during the event.

UE1, UE2, UE3, UE4, UE5 are under BSS coverage. UE7 is temporary out of BSS coverage. UE7 has been under coverage at a certain moment and has been able to collect the manifest.

Figure 3:
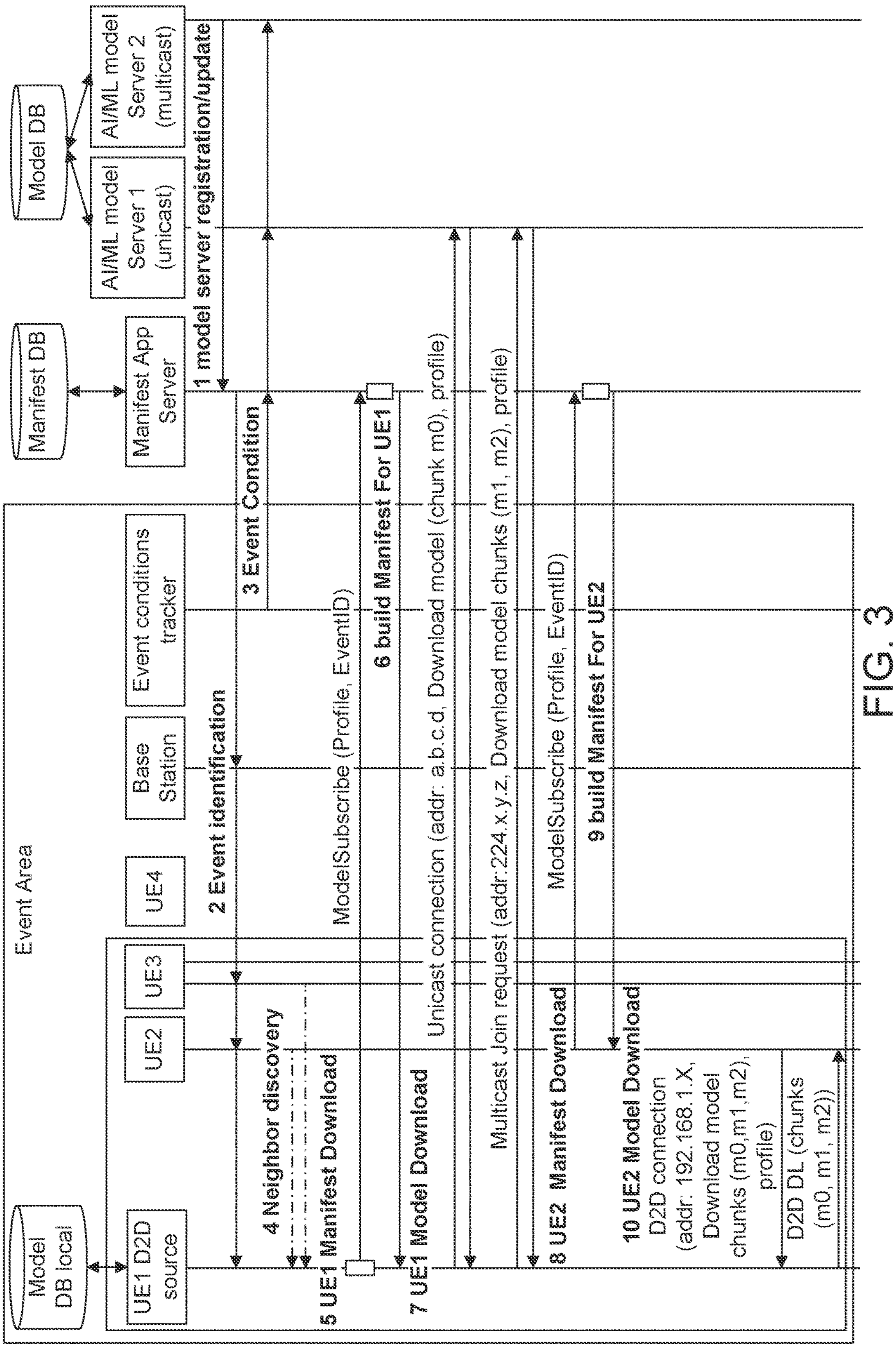
FIG. 3 illustrates a sequence diagram for performing AI/ML model downloading, according to an embodiment.

FIG. 3 details a sequence diagram for the setup illustrated in FIG. 2, according to an embodiment. In particular, FIG. 3 further illustrates manifest and model download from a first UE1 source followed by a manifest and a model download from a second UE2 provided that UE1 in the vicinity of UE2 is a source for UE2. The AI/ML model comprises three chunks (chunk0, chunk1, chunk2).

In FIG. 3, the Manifest application server provides the manifests comprising the set of network communication paths and conditions for a UE to obtain whole or part of the model data from AI/ML servers. The AI/ML servers provide AI/ML model data for UE. AI/ML model servers can be on the cloud or on the edge of the core network. In addition, a list of source UEs under control of the Manifest application server may act as AI/ML servers through local D2D communication like ProSe (see 3GPP TS23.303, "Proximity-based service (ProSe): Stage 2"). AI/ML model servers including D2D servers may provide data model from unicast, multicast or broadcast mode.

UEs (UE1, UE2, UE3) run an AI/ML event application requesting an event manifest for downloading whole or part of an event model to run the AI/ML algorithm.

In the following, the procedure is described in detail.

1. Model server registration/update: the AI/ML servers are provisioned and regularly updated.
2. Event identification: Prior to subscribing to a manifest, the UE should be provisioned with relative event information, e.g., event Identification including authorization. Different provisioning techniques may take place from application, or from network discovery. The UE should get at least an event/model identifier required for further subscription.
3. Event condition: An event condition Tracker that may be an entity (Application Function/Server) locating inside the event area that monitors and tracks the event conditions. When a condition event changes (e.g., a new scene according to a planning), the tracker triggers a new event condition to the Manifest Application server and AI/ML model server for selecting a relevant AI/ML model. An example may be a new light update condition that requires a light modification on the model for a concert. For indoor, the lightning director may control the event condition tracker application to start a new light shed starting when a new song is played. This event time must be triggered in live to the exact event time. For outdoor, this can be triggered from new weather conditions (Sunny, Cloudy). An event may be scheduled as well, e.g., when the sun sets and the night comes.
4. Neighbor discovery: UE1 is a D2D source for other UEs and has privileged access to unicast and multicast servers. UE1 must be on coverage to download manifests and AI/ML model data. UE1 may first listen which are the neighbor UEs in its vicinity to build a UE neighbor map. The Manifest application server may use this neighbor map to select only relevant direct D2D sources, those which are located in the vicinity. For this example, UE1 discovers neighbors and may build a neighbor map comprising UE2 and UE3. Neighbor Discovery may be based on monitoring Discovery announcements message as above, from listening discovery answers after sending discovery requests in the neighborhood.
5. UE1 manifest download or model subscription: UE1 then establishes a communication with the AI/ML server and subscribes ModelSubscribe for a particular event according to different subscription parameters such as model information including at least the event Identifier, the UE profile and network information. For example, the subscription parameters can include some or all of the following:

Scene information:
- Scene identifier: e.g., scene_0, scene_1, all_scenes,

Model information
- Model type: audio, video, picture (multiple choices possible)
- Model subset: Partial/Full, e.g., Partial for limited chunks and Full for the whole model
- Model Request identifier authorization UE Profile
- Operating System: iOS/Android
- UE Name
- AI/ML engine
- AI/ML engine version
- CPU/GPU capabilities (NPU/GPU type, NNAPI, CPU type, RAM available)

Network information
- UE network capability List: (Multicast, Unicast, Direct D2D)
- Neighboring UE (For source UE): list of neighbor UE identifier
- Neighbor composition (default: Full list/Neighbor list only)

Environment
- Point of interest localization
  - Far/Close distance
  - Front/Side distance
- Left/right distance. Noise measurement calibration excerpt: data to upload 6. Build manifest for UE1: the Manifest Application server computes the subscription profile against other previous profiles and looks for profiles similar to UE1, otherwise computes a new AI/ML manifest for UE1 profile. The Manifest application server may first look for all the network resources available on distant AI/ML servers for the different communication modes:

Unicast: The Manifest application server searches for AI/ML model server capacity according to the UE capabilities and according to the UE profile range (Premium, Medium, Basic). The Manifest application server may select a set of different unicast AI/ML model servers. It then provides the unicast addresses for each possible AI/ML model server within the Manifest file.

Multicast carousel: Similarly to unicast, The Manifest application server looks for one or several multicast sources adapted for the UE. For multicast carousel, the AI/ML multicast server must provide the ratio parameter for each particular chunk against the whole chunks. For example, a ratio of 0.5 means that half of the time, the carousel transmits this same chunk. The AI/ML multicast server may also compute an average expected availability time linked to the previous ratio as well as its own capabilities. Another possibility is to index the ratio of chunk m0 in the carousel with the number of initial requests, i.e., the more chunk m0 is requested, the more frequent it is in the carousel, this will decrease the delay.

The Manifest application server may also compute the UE1 neighbor map to find local AI/ML model servers of neighbor UEs that can be considered as an alternative direct source to UE1. The Manifest application server may add new D2D network resources in the manifest. For this step, The Manifest application server considers or finds local resources available for UE1 and the manifest files only comprise distant resources.

The Manifest application server may communicate with the core network to obtain additional UE information regarding the pending request.

UE data plan level: Premium/Basic

UE event subscription option: Yes/No

D2D/ProSe Application authorization: Event authorization Yes/No

At the end, the Manifest application server builds a specific manifest for UE1. The manifest for UE1 only exposes unicast and multicast resources since UE1 acts as UE source and has privileged access to legacy servers. Chunk information includes one unicast and one multicast server providing different chunks according to different expected download time.

The manifest for UE1 contains the list of model and model's chunks with their characteristics as illustrated in FIG. 4, which provides the manifest composition.

7. UE1 model download: UE1 establishes a communication with both servers to optimize the download e.g., get chunk m0 from unicast server and further chunk m1, m2 from the multicast carousel server.
8. UE2 manifest download or model subscription: this is similar to UE1 manifest download or model subscription, but for UE2. UE2 then establishes a communication with AI/ML server and subscribes ModelSubscribe as well.

In particular, UE2 may indicate the D2D network capability and specifically which kind of Neighbor composition the UE expects. By default, the manifest application server lists all the UE source and which chunks each different UE source serves. If UE2 indicates "neighbor list only", the manifest application server will compute all the relevant neighbor lists received from different UE sources, then adds only UE sources in the vicinity or close enough to UE2.

Similar to step 6 but for UE2, the Manifest application server looks for all the network resources available from a distant communication or from local D2D communication with respect to UE2 neighbor map, for the different communication modes i.e. unicast, multicast, multicast carousel. Differently from step 6, the Manifest application server finds UEs in the vicinity.

9. Build manifest for UE2: The manifest file for UE2 may comprise another UE source e.g., UE4 but UE4 is not in the vicinity of UE2. There are two options for that case depending on the neighbor composition:

Full list: The Manifest indicates UE4 as a source UE. It is up to UE2 to try establishing a communication with the different listed source UEs (e.g., Ping) or to only consider UEs that UE2 has already discovered.

Neighbor list only: Differently from above, the Manifest will only indicate the relevant UE1 source. UE4 will not appear.

The manifest for UE2 contains the list of model and model's chunks with their characteristics as illustrated in FIG. 5, which provides the manifest composition. UE2 finds that UE1 may provide the requested chunks m0, m1, m2 with a very low expected delay. UE2 establishes a D2D communication with UE1 and downloads chunks m0, m1, m2 from UE1.

When any UE receives the AI/ML Manifest, it computes and applies whole or part of the manifest. The UE may connect to one or several network communication paths to download the needed model chunks. It then feeds the model into memory and run the application.

10. UE2 model download: UE2 establishes a unicast communication with UE1 to download m0, m1, and m2. Prior to establishing the communication, UE1 and UE2 shall be authorized to communicate with each other. Therefore UEs may be configured with relevant security materials for enabling the communication.

In the above, a D2D communication may comprise several one-to-one and one-to-many communication, i.e., multicast also called groupcast or broadcast in 3GPP through a PC5 interface. For a one-to-many communication, the UEs are usually configured with a set of parameters (multicast address, group IDs and radio related parameters). In general, for 3GPP D2D over PC5, there is no explicit signaling protocol. Therefore, The source UE (e.g., UE1) finds the appropriate radio resource and sends the IP data to the IP multicast address Group ID as Destination Layer 2 ID (e.g., using the ProSe Layer 2). A receiving UE (e.g., UE2), configured with the group context, listens to the appropriate radio resource and filters out frames according to a Group ID (e.g., ProSe Layer 2) contained in the Destination Layer 2 ID.

Therefore, another embodiment includes a one-to-many D2D communication according to 3GPP, a manifest indicating a D2D multicast path may carry additional configuration parameters such us the group ID and the radio related parameters. An example of multicast D2D chunk can be:

chunk m1: UE1: multicast group address, Group IDs (e.g., ProsE), radio related parameters, expected: 2 ms.

In the above, the procedures for the UEs to download the manifest and the AI/ML model are described. It should be noted that the steps can be performed in the order as described above. However, the orders of the steps can also be adjusted. For example, step "4. Neighbor discovery" can be performed at any time and ideally when UEs enter the event area. In the case where step "4. Neighbor discovery" is performed later, the manifest file may not contain the D2D communication path and is therefore limited to the unicast and multicast communication paths. A UE may update its neighbor map to the manifest server at any time, for example, after receiving a new neighbor discovery that triggers a new neighbor map, when the UE detects a new event condition or when the UE requests a new model with a new profile to the server.

When the AI/ML model server receives event conditions update, it may compute a new fresh AI/ML model and a new fresh manifest. According to the subscription, the UE will be notified that a new model is available via a manifest update.

The procedure as described in FIG. 3 may be applied in accordance with the current or future 3GPP standard, such as 3GPP TS 26.501 "5G Media Streaming (5GMS): General description and architecture". Alternatively, manifest based procedures for unicast may be similar to a DASH streaming procedure as described in Section 5.2.3 "Unicast Downlink Media Streaming Session establishment DASH streaming".

The Manifest AP server as described in FIG. 3 may be similar to a 5GMS downlink Application Function (5GMSd AF in short), and the AI/ML model server (unicast) may be similar to 5GM downlink Application Server (5GMSd AS in short). Multicast (carousel or not) may be applied in accordance with the current or future 3GPP standard such us 3GPP TS 26.502 "5G multicast-broadcast services: User Service architecture". Multicast-Broadcast Service Function (in short MBSF) may be an component of the Manifest App server for the control of the multicast service and Multicast-Broadcast Application Server (MBS AS) may be similar to AI/ML model server (multicast).

FIG. 4 and FIG. 5 illustrate examples of manifest for UE1 and UE2. More generally, the AI/ML model manifest contains information of all the available models and all the possible network communication paths and conditions to download whole or part of each AI/ML model divided in chunks, usable for a scene. In one embodiment, the manifest contains some or all of the following information.

Manifest composition
Manifest information
Manifest version
Event identifier
Models list [
  Model identifier
  Model media type enumeration {audio, video, picture}
  Model description: short description of the model
  Model size
  Model name
  Model framework
  Compatibility framework version
  Compatibility NNAPI version
  Associated metadata file reference
  Model chunk number
  Model usage type: enumeration {full, incremental}
  Model usage type extension: enumeration {regular, specialization, adaptive}
  Specialization: description
  Bandwidth: float
  Model application time
  Chunks information [
    Chunk ID number
    Checksum
    Chunk type
    Memory_loading_offset
    Expected_availability_time
    Expected_frequency_availability
    Unicast IP address list [ ]
    Multicast IP address list [ ]
    D2D discovery_group_identifier list [ ]
  ] #end of chunk's list
] #end of model's list In the following, we describe the information contained in the manifest.

- Manifest information: string—communicates general information on the manifest (e.g., manifest dedicated to <area name><event description>)
- Manifest version: string—updated at each change of the manifest
- Event identifier: string—defines the event and the scene of the event, it can be a concert, sport event, etc.
- Model identifier: string
- Model media type: string—model's media target (i.e., audio, video, picture)
- Model description: string—short description of the model
- Model size: integer—Defines the size of the model to be downloaded in Kilo Bytes.
- Model name: string—defines the model name, e.g., resnet50, vgg-16, etc.
- Model framework: IA framework needed to run this model (e.g., tensorflow, PyTorch, . . . )
- Compatibility framework version: e.g., tensorflow >1.10
- Compatibility NNAPI version: expected NNAPI version to run the model
- Associated metadata: file reference, e.g., a file containing the names of the objects/the artists/the musical instrument brand for an object/people recognition
- Model chunk number: integer—Defines the number of chunks, including chunk #0, for a full model
- Model usage type: enumeration {full, incremental}
  - Full: the AI/ML model is not split and shall be downloaded completely before it can be loaded in the AI/ML framework and executed.
  - Incremental: a regular model is split in N sub-models, each of these sub-models can be transported individually. The first chunk ("model entry") can be used as-is, i.e., it may generate results.
- Model usage type extension {regular, specialization, adaptive}
  - Regular: the AI/ML model is split, and no specific process is applied on the generated chunks.
  - Specialization: a regular model is split in N sub-model, but at maximum N−1 sub-models are specialized. Chunk #0 is the non-specialized base model. Many specializations may be defined.
  - Adaptive: a regular model is split in N sub-model and the N−1 chunks are compressed or not.
- Specialization: string—defines a specialization method for that model. E.g., the model detects the birds, the specialization is "sea bird".
- Bandwidth: float—defines the bandwidth capabilities of the UE.
- Model application time: string—defines the time when the model shall be applicable.

Model usage type

Full model

Figure 6:
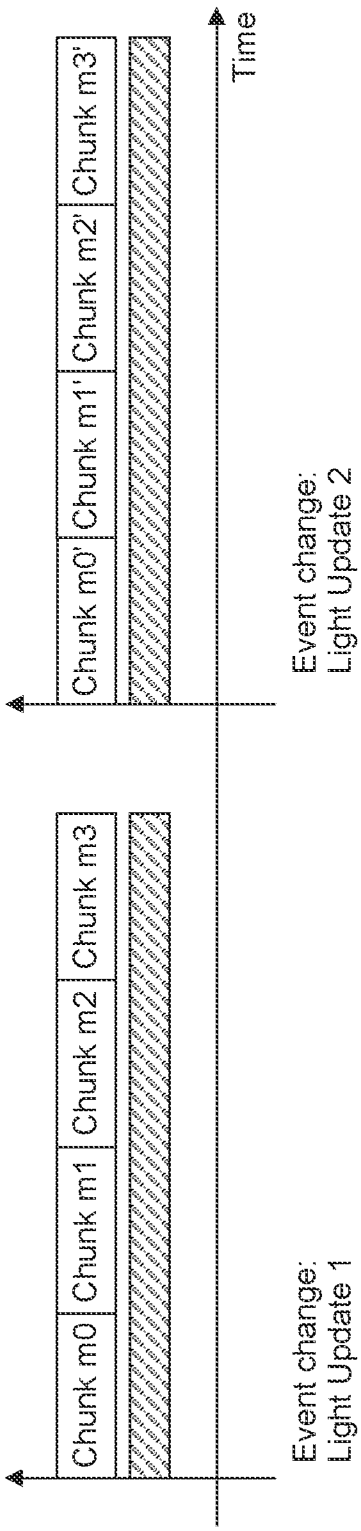
FIG. 6 illustrates a full model.

As illustrated in FIG. 6, this model requires all chunks to work, i.e., if a model is made of n chunks, the UE needs to get all n chunks to be able to run the model. When event conditions change, that needs a new model, the UE needs to collect all the new chunks.

Figure 7:
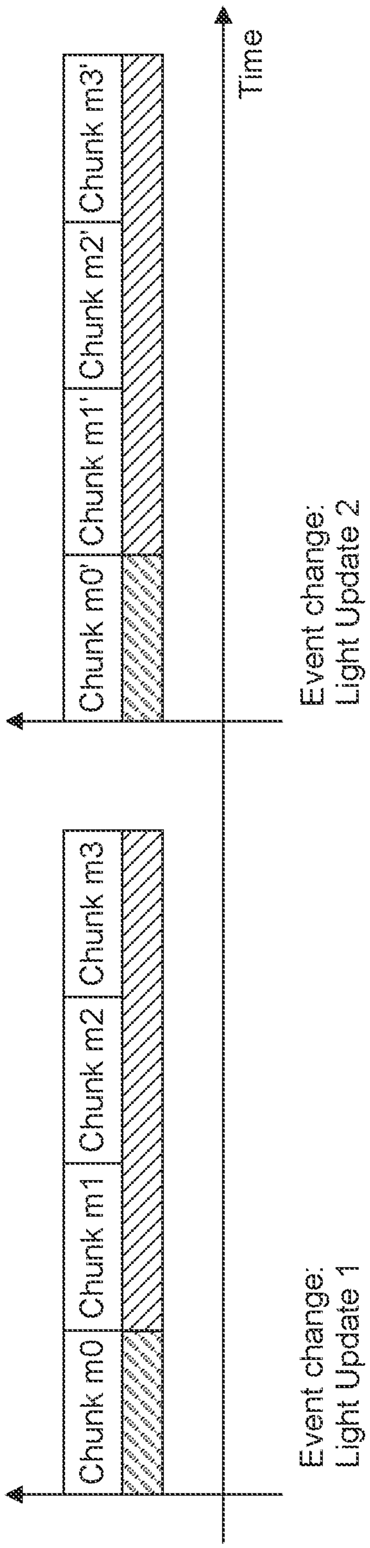
FIG. 7 illustrates an incremental model.

Incremental:

This kind of model is made of several chunks but can work, in a degraded way, with only the n first chunks. The other chunks permit to obtain a better result but are not mandatory. In the example as shown in FIG. 7, only chunk 0 (resp, chunk 0') is mandatory.

Figure 8A:
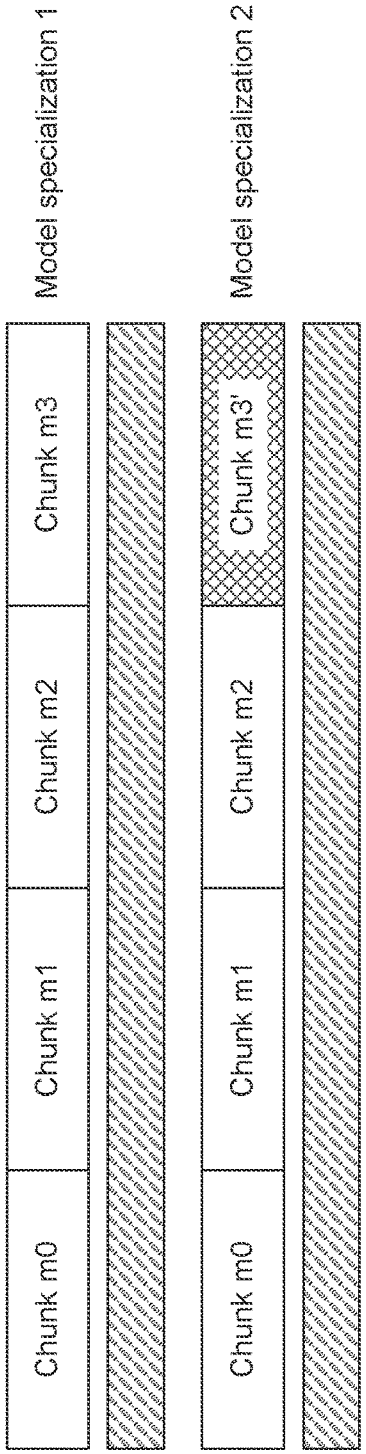
FIG. 8A illustrates a specialized model.
Figure 8B:
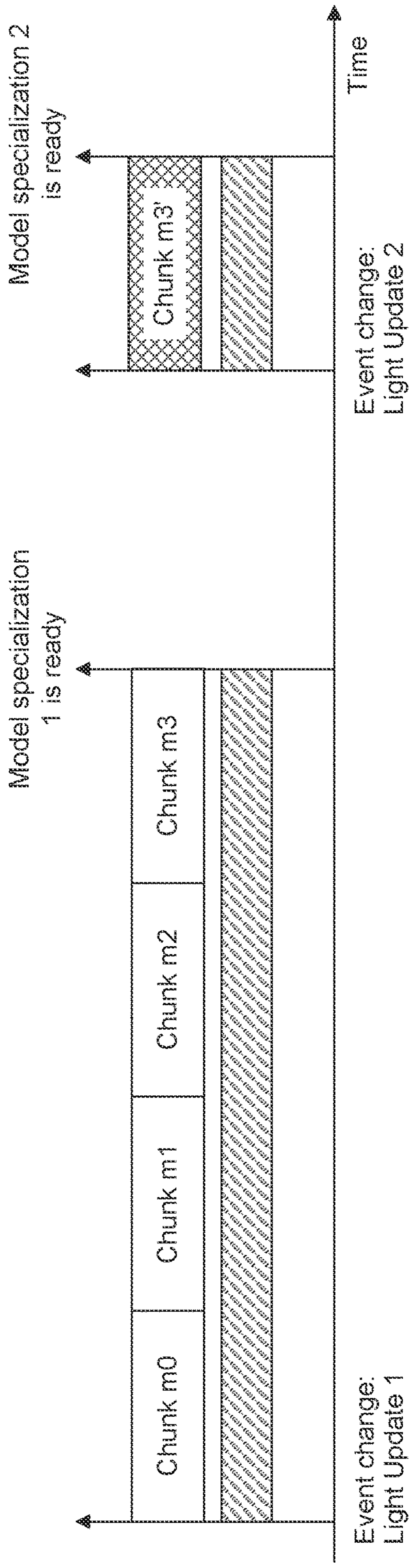
FIG. 8B illustrates specialized model update.

Specialization:

This a full model that is specialized at the end. In the example as shown in FIG. 8A, two models contain the same three chunks 0, 1 and 2, and differ only by the last chunk 3 that contains the specialization. It means that if the event change can be managed by this kind of model, only the last part of the model needs to be updated as shown in FIG. 8B.

Chunks Information

The network chunk information shall help the application fit the chunk into the machine learning framework. The chunk information part comprises a set or a list of individual chunk information depending on the model chunk number defined above on general information.

- Chunk ID number: integer—defines the chunk number, from 0 to (Model chunk number—1) This parameter can be useful if the chunk has to be re-transmitted.
- Chunk checksum: hexadecimal—sha256 checksum to check the integrity of each chunk.
- Chunk type: enumeration—defines the type of the chunk. "model entry" is the base chunk, it is mandatory for starting the inference process.

"regular intermediate chunk" requires a "model entry" for working.

"final chunk" means the end of the model.

"specialized intermediate chunk" may follow a "model entry" chunk or a "regular intermediate chunk". This is informational.

"adaptive chunk" means that the model server supports the adaptive mode, hence the application can use the "bandwidth" parameter to request a chunk that is adapted to its available bandwidth.

Note: all these chunks may not arrive in the correct order i.e., "model entry", "regular intermediate chunk" and finally "final chunk". To avoid that issue, the specific parameter memory_loading_offset" is set as described below.

Unicast IP address list [ ]: list of model servers IP addresses accessible in unicast.

Multicast IP address list [ ]: list of the multicast carousels.

D2D discovery_group_identifier list [ ]: list of the D2D groups for neighbour discovery D2D multicast/groupcast/broadcast radio related parameters: A D2D receiver configures its radio parameters, listens the radio resources and filters out frames according to a Destination Layer ID Expected inference time: integer—expressed in milliseconds (ms), it defines the time it takes for a model to process input data and compute a decision. The manifest server can compute the average inference time applied to the device, from the received device profile, capabilities and information.

Expected availability time: integer—expressed in milliseconds (ms), it defines the download duration, i.e., the delay after which the chunk model can be loaded in the AI/ML framework memory and then used. In case of Multicast Carousel, this time takes into account the transfer time plus the delay to have the chunk available in the carousel.

Expected frequency availability: float—is a ratio and is used for the Multicast Carousel mode. It defines how often in a period of time (e.g., one minute) the chunk is available in the carousel.

Memory loading offset: integer—defines the offset where the chunk is to be copied in the AI/ML framework memory. This parameter is useful for the Multicast Carousel mode and especially when all the chunks are not equally available in a period of time, e.g., chunk m0 is more often present in the carousel.

The description of the Manifest composition model may be inspired from Media Presentation Description (MPD) as described in to ISO/IEC 23009-1 "Dynamic adaptive streaming over HTTP (DASH)—Part 1: Media presentation description and segment formats" or in TS 26.247 "Transparent end-to-end Packet-switched Streaming Service (PSS): Progressive Download and Dynamic Adaptive Streaming over HTTP (3GP-DASH)", both for unicast representation. For multicast representation including multicast carousel, it may be inspired from ETSI TS 103 769 "Digital Video Broadcasting (DVB): Adaptive media streaming over IP multicast".

In particular, the Manifest composition above composed of Manifest information, Manifest version, Event identifier, Models list defines and describes parameters that may follow the same type of format and presentation according to the references above, but adapted to AI/ML. For example the terminology "Media" may be refined as "AI/ML model data".

In the following, examples of network chunk information are provided.

Example of Chunk Available in Carousel Mode.

```
List {
  Chunk ID number: 1
  Chunk checksum:
    db72a3f74cbcf04841fe4013aalfd2766713397924f15a
      9557acb993fb02823e
  Chunk type: regular intermediate chunk
  Unicast IP address list: [ ]
  Multicast IP address list: [224.0.1.x]
  D2D discovery_group_identifier list: [ ]
  Expected availability time: 12 ms
  Expected frequency availability: 0.50
  Memory loading offset: 0x200
}
```

Example of Chunk Available in D2D Mode.

```
List {
  Chunk ID number: 5
  Chunk checksum:
    5a73a3f74cbcf04841fe4013aalfd2766713397924f15a
      9557acb993fb02823e
  Chunk type: regular intermediate chunk
  Unicast IP address list: [100.200.10.20]
  Multicast/groupcast/broadcast IP address list: [ ]
  D2D discovery_group_identifier list: [1245582122] (e.g.,
    from FIG. 5, UE1 IP address)
  D2D multicast/groupcast/broadcast Radio related param-
    eters
  Expected availability time: 5
  Memory loading offset: 0x800
}
```

Multicast Carousel download and memory loading offset parameter

The multicast carousel is managed by an entity, for example, the Mobile Network Operators (MNO), the Content Providers or a third party. They fit the carousel with all the chunks, and the way how the chunks are organized within the carousel may vary a lot and may depend on various strategies. Thus they can decide to present more frequently chunk m0 comparing to the other chunks. This is a logical decision since chunk m0 is the most important chunk, which is a sub-model and can be used as-is, and will deliver inference results until next chunks arrive and that the full model is reconstructed.

Figure 9A:
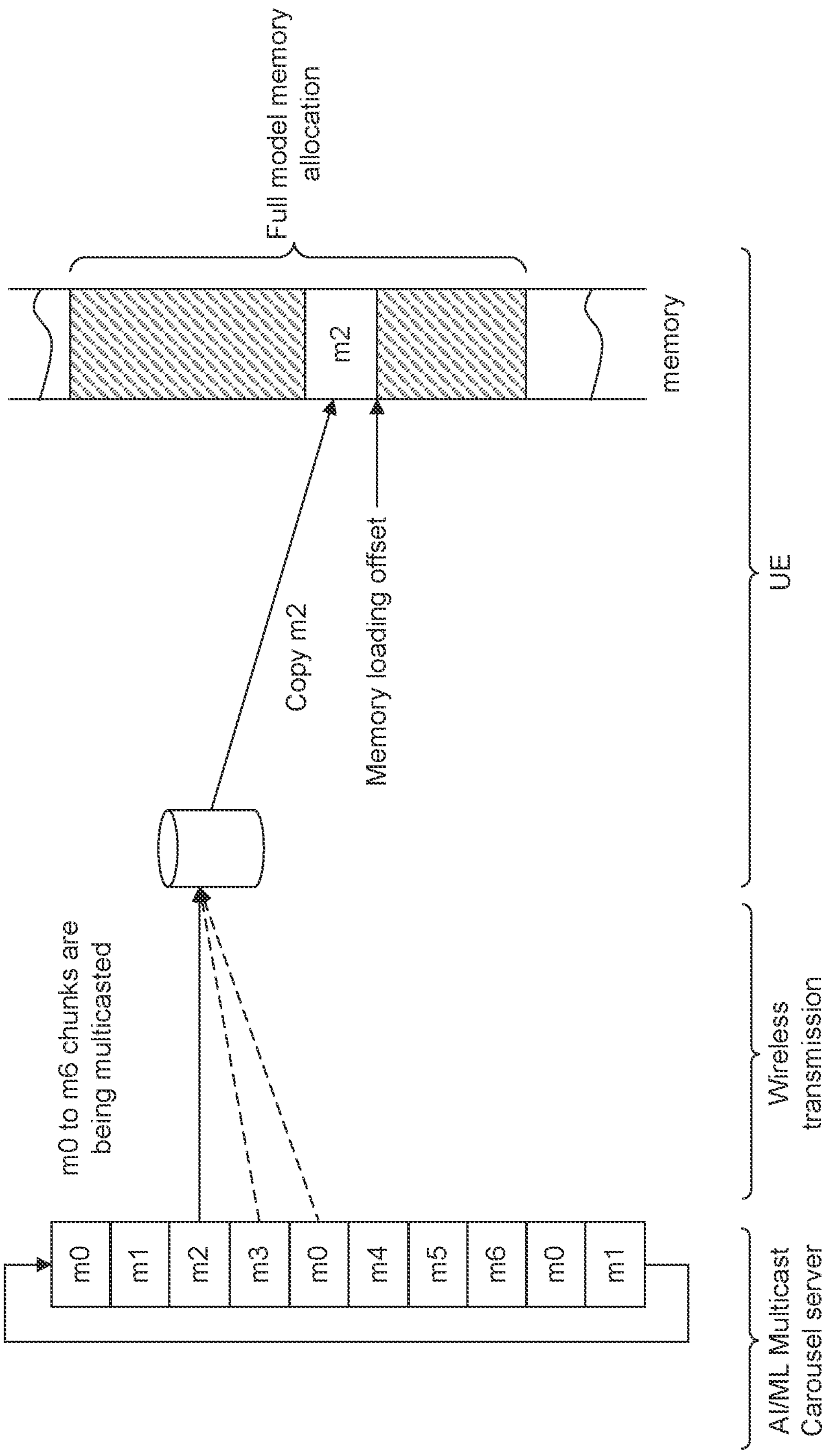
FIG. 9A, FIG. 9B and FIG. 9C illustrate chunk m2 download, chunk m3 download and chunk m0 download, respectively, in the multicast carousel mode, according to an embodiment.

When the UE subscribes to the multicast carousel, the carousel starts transmitting the chunk at that time which is not necessarily chunk m0. Thus, in FIG. 9A, the first chunk to be delivered to the UE is chunk m2. In the illustrations, the diagonal stripes represent the free memory that should be occupied when all the chunks are downloaded and then loaded.

For the sake of efficiency, the UE shall not drop chunk m2. It can fit in advance the AI/ML framework with chunk m2 using the following parameters:

Model size: used to reserve the memory space for the whole model.

Memory loading offset: used to place in the AI/ML framework memory the chunk at the correct address.

Model name.

In an example, the API code can be expressed as: load_model(Model name, Model size, Memory loading offset, chunk_data).

Figure 9B:
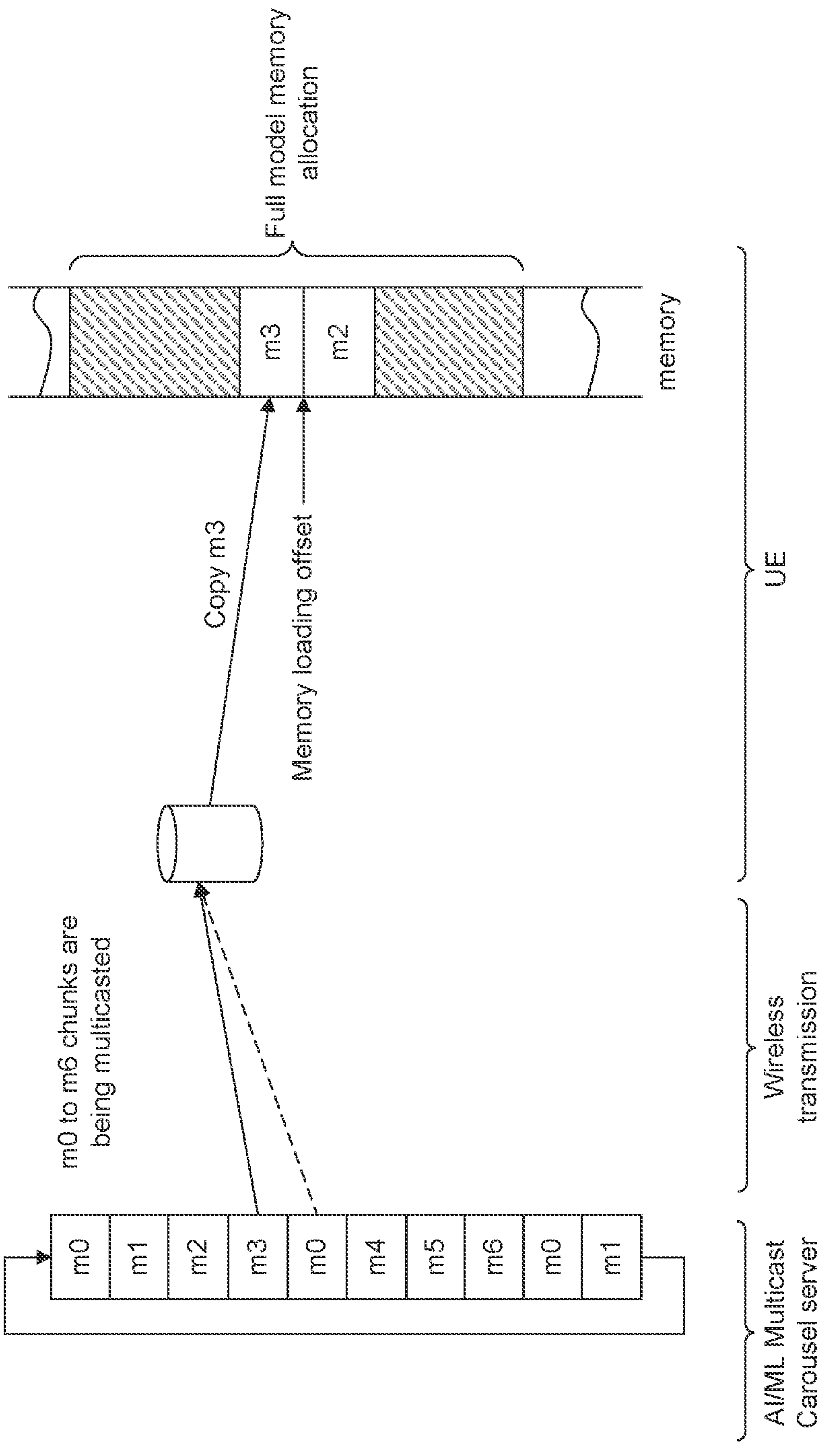

FIG. 9B illustrates the transmission of the second chunk, m3. As for chunk m2, the UE loads m3 in the AI/ML framework memory with the same API.

Figure 9C:
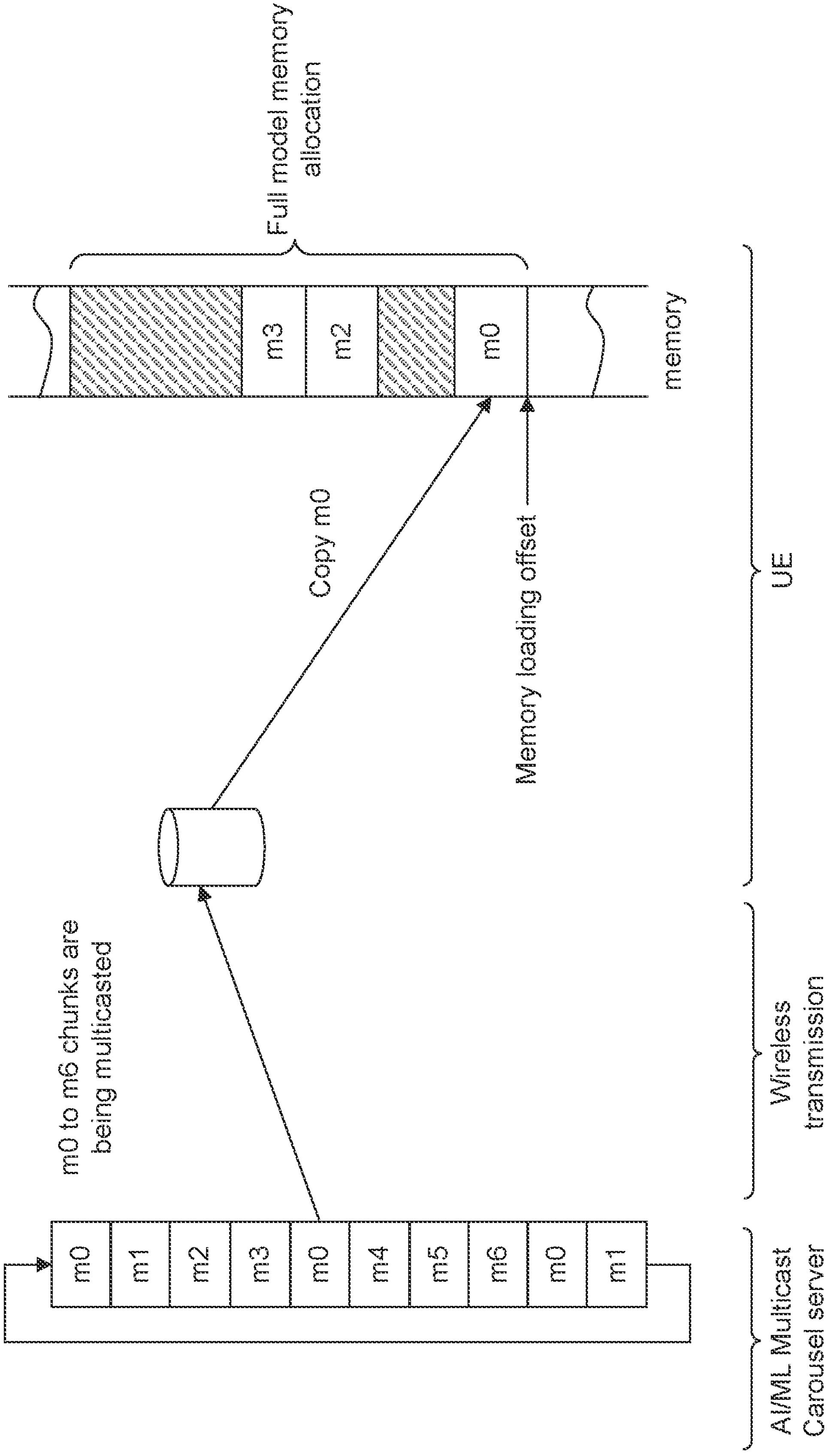

In FIG. 9C, chunk m0 is downloaded by the UE and then loaded in the AI/ML framework memory. After the loading operation, m0 is operational. It means that sensor data (from camera, microphones, etc.) can fit the model, and the model will infer and generate prediction results.

After m0, the next chunks are m4, m5, m6, again m0 (that will be dropped since already loaded) and m1. When m1 is loaded, the complete model is now operational and can deliver inference results with a higher score. Other chunk ordering strategies can be envisioned to make the download more efficient.

Chunks Creation

Figure 10:
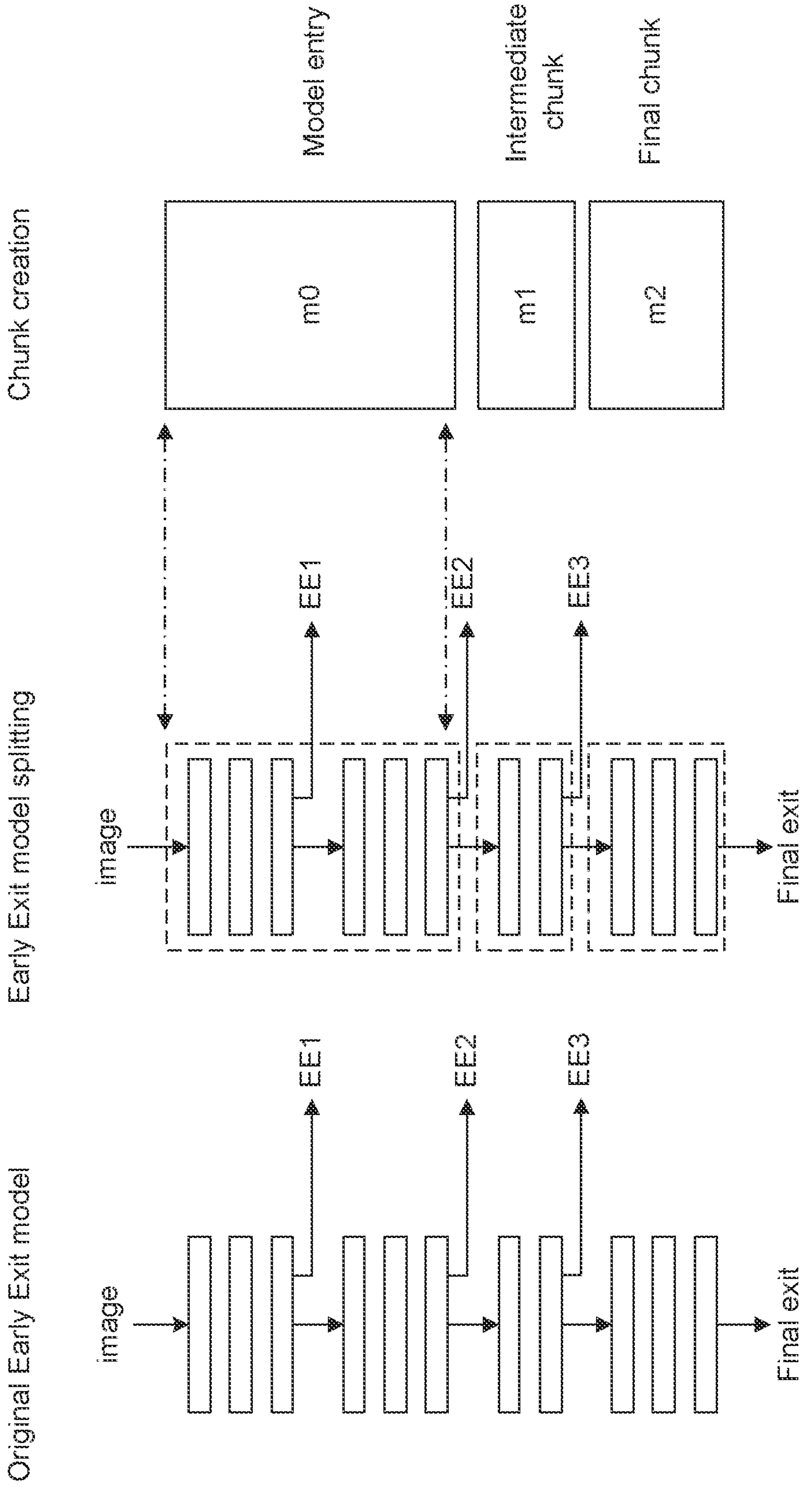
FIG. 10 illustrates an example of DNN model splitting.

The original AI/ML model is split in chunks according to various methods, as illustrated in an example in FIG. 10. It is up to the entity (MNO, Content Provider, Third party) that manages the AI/ML model server to split the AI/ML model.

FIG. 10 depicts an example of splitting a model based on the Early Exit (EE) mechanism. The deep neural network (DNN) has been redesigned so that when some score conditions are satisfied, the process stops earlier and generate a result (a score). By exiting earlier, the score may be less than if the whole model would have been parsed, but time has been saved. Thus, it is possible to reuse this Early Exit mechanism, to create a first chunk named "model entry," which is not heavy in size and therefore can be transported quickly on the network. This "model entry" chunk is the base of the full DNN model and it can work as-is, i.e., without the other chunks. At the opposite, if chunk m2 arrives first, it cannot generate any result because it requires the results of chunk m0 to work. Once the model has be re-assembled, it works as the original model.

In the example of FIG. 10, an image that is pre-processed fits the model, each layer generates features that become inputs for the next layer till the final output.

Carousel creation and expected frequency availability parameter

Figure 11:
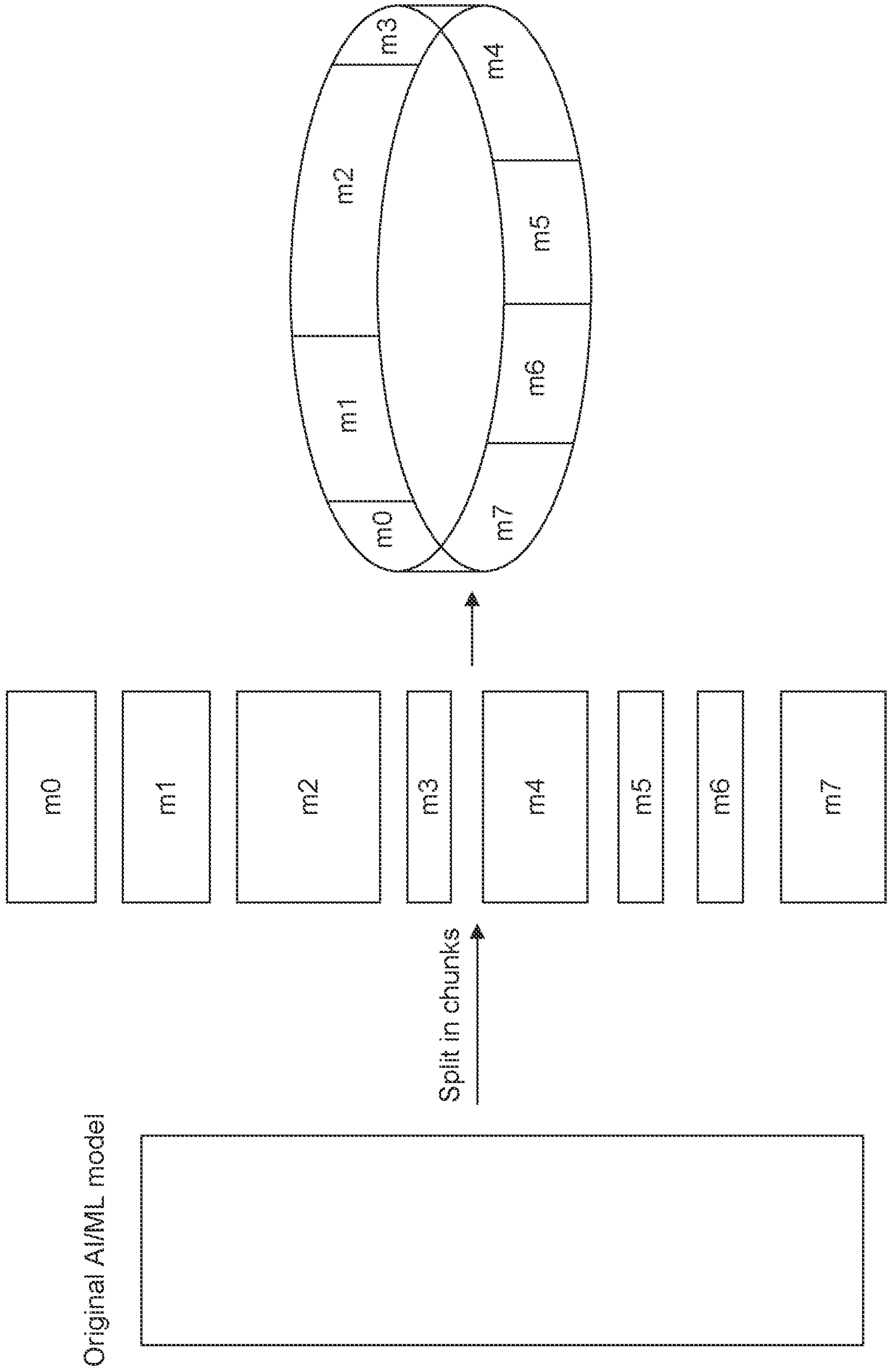
FIG. 11 illustrates carousel creation from an AI/ML model, according to an embodiment.

In one embodiment, the model is first split in many chunks, the generated chunks then fit the carousel according to different strategies as illustrated in FIG. 11.

The parameter "Expected_frequency_availability" in the manifest specifies the number of times a chunk appears in a carousel loop. Thus, we imagine that a carousel is defined by a duration, e.g., 3 minutes. In this time frame, chunk m0 can appear many times in proportion to the presence of the other chunks. If the parameter value of "Expected_frequency_availability." is 0.50 (50%), it means that half of the time, the carousel transmits chunk m0, the rest is shared among chunks m1 to m7. The way the chunks are distributed in the carousel is not described here and depends on the mobile network operator or the content provider or the third party.

AI/ML Framework

An AI framework provides APIs to perform some related AI tasks. At least two AI framework APIs can be used: load_model( ) and update_model( )

In the following, a manifest example is provided. In this example, the concert has started, the artistic director has planned a scene change, and a new manifest is transmitted to the UEs that have subscribed to this option. For this new scene, three new models are proposed for audio, video and picture. They are all available in the incremental format. Some models are available in unicast and/or in multicast and/or in D2D.

Manifest information: manifest dedicated to UEs present in the event area for the scene E00

```
Manifest version: 2021.1315
Event identifier: Concert X
model_list-[
  /* First model: Audio type model to clean-up the audio recordings. It is available in
  incremental mode with three chunks. It is useable with the pytorch framework. The chunk
  with id = 2 is available in unicast and with the multicast carousel. * /
  [
  model_identifier: E00_A
  model_media_type: audio
  model_description: "clean-up audio recordings"
  model_name: "denoising" ##e.g., for the sake of conciseness, the model name is "m" and
  chunks name are identified as m0, m1, m2.
  model_framework: pytorch
  compatibility_frame_work_version: 1.5.1
  compatibility_NNAPI_version: 1.3
  associated_metadata_file_reference: metadata_a.data
  model_chunk_number: 3
  model_usage_type: incremental
  model_usage_type_extension: specialization
  model_size: 80000 bytes
  bandwidth: None
  specialization: "people whistling"
  model_application_time: immediate
  chunks_information=[
    [
    chunk_id_number: 0
    checksum: db72a3f74cbcf04841fe4013aa1fd2766713397924f15a9557acb993fb02823e
    type: model entry
    Unicast IP address list: [172.23.24.25]
    Multicast IP address list: [ ]
    D2D discovery_group_identifier list: [ ]
    expected_availability_time: 25
    expected_frequency_availability:
    memory_loading_offset: 0x0
    ],[
    chunk_id_number: 1
    checksum: fae015df3685aae265fc02ad362002dfa23cc6007ad8ad22541acf36002ef2210a
    type: specialized intermediate chunk
    Unicast IP address list: [ ]
    Multicast IP address list: [224.0.1.x]
    D2D discovery_group_identifier list: [ ]
    expected_availability_time: 60
```

-continued

```
    expected_frequency_availability: 0.20
    memory_loading_offset: 0x989680
    ],[
    chunk_id_number: 2
    checksum: 102ad25d4c89aad362c00adfbb63b2145b01c25ad69544adc23caa021230dffc9
    type: final chunk
    Unicast IP address list: [ ]
    Multicast IP address list: [224.0.1.x]
    D2D discovery_group_identifier list: [ ]
    expected_availability_time: 30
    expected_frequency_availability: 0.20
    memory_loading_offset: 0x1C9C380
    ],[
    chunk_id_number: 2
    checksum: 102ad25d4c89aad362c00adfbb63b2145b01c25ad69544adc23caa021230dffc9
    type: final chunk
    Unicast IP address list: [172.23.24.25]
    Multicast IP address list: [ ]
    D2D discovery_group_identifier list: [ ]
    expected_availability_time: 25
    expected_frequency_availability:
    memory_loading_offset: 0x1C9C380
    ]
  ] /* end of chunk list */
  ], /* end of first model description */
  /* Second model: Video type model to improve the ambient lights. It is available in
  incremental mode with four chunks. It is useable with the tensorflow framework. The chunk
  with id = 0 is available in unicast and with the multicast carousel. * /
  [
  model_identifier: E00_V
  model_media_type: video
  model_description: "ambient light improvements"
  model_name: "lighting"
  model_framework: tensorflow
  compatibility_frame_work_version: 1.5.1
  compatibility_NNAPI_version: 1.3
  associated_metadata_file_reference: metadata_v.data
  model_chunk_number: 4
  model_usage_type: incremental
  model_usage_type_extension: specialization
  model_size: 90000
  bandwidth: None
  specialization: "cold light removal"
  model_application_time: immediate
  chunks_information=[
    [
    chunk_id_number: 0
    checksum:
    ed0214aad5624cdd2015a1248aad9586dc3b61c24a01a125d2dea023ef0298aad8c5
    type: model entry
    Unicast IP address list: [172.23.24.25]
    Multicast IP address list: [ ]
    D2D discovery_group_identifier list: [ ]
    expected_availability_time: 50
    expected_frequency_availability:
    memory_loading_offset: 0x0
    ],[
    chunk_id_number: 0
    checksum:
    ed0214aad5624cdd2015a1248aad9586dc3b61c24a01a125d2dea023ef0298aad8c5
    type: model entry
    Unicast IP address list: [ ]
    Multicast IP address list: [224.0.1.x]
    D2D discovery_group_identifier list: [ ]
    expected_availability_time: 40
    expected_frequency_availability: 0.60
    memory_loading_offset: 0x0
    ],[
    chunk_id_number: 1
    checksum:
    fae015df3685aae265fc02ad362002dfa23cc6007ad8ad22541 acf36002ef2210aa2366
    type: regular intermediate chunk
    Unicast IP address list: [ ]
    Multicast IP address list: [224.0.1.x]
    D2D discovery_group_identifier list: [ ]
    expected_availability_time: 30
```

-continued

```
        expected_frequency_availability: 0.20
        memory_loading_offset: 0xE4E1C0
        ],[
        chunk_id_number: 2
        checksum:
        25df031ade2500cf36bb0124a458a73600bb3695de12ad145e0a236ed0cb364a5de2
        type: specialized intermediate chunk
        Unicast IP address list: [ ]
        Multicast IP address list: [224.0.1.x]
        D2D discovery_group_identifier list: [ ]
        expected_availability_time: 40
        expect_frequency_availability: 0.10
        memory_loading_offset: 0x2625A00
        ],[
        chunk_id_number: 3
        checksum:
        32a0cf0b1245f0c0b236a69de3250021cf236ad65f345a8dc000b036fb0bb365a78e01
        type: final chunk
        Unicast IP address list: [ ]
        Multicast IP address list: [224.0.1.x]
        D2D discovery_group_identifier list: [ ]
        expected_availability_time: 30
        expected_frequency_availability: 0.10
        memory_loading_offset: 0x42C1D80
        ]
], /* end of chunk list */
], /* end of second model description */
/* Third model: Picture type model to apply some scene effects. It is available in incremental
mode with four chunks. It useable with the tensorflow framework. The chunk with id=0 is
available in unicast and with the multicast carousel and all the intermediate chunks are
available in D2D. * /
[
model_identifier: E00_P
model_media_type: picture
model_description: “apply some scene effects“
model_name: “lighting“
model_framework: tensorflow
compatibility_frame_work_version: 1.5.1
compatibility_NNAPI_version: 1.3
associated_metadata_file_reference: metadata_p.data
model_chunk_number: 4
model_usage_type: incremental
model_usage_type_extension: regular
model_size: 35000
bandwidth: None
specialization: model_application_time: immediate
chunks_information=[
        [
        chunk_id_number: 0
        checksum:
        df0120ef2aa0269dfc3504acv012ee028a78d002aa3f6958efcbb036210b0ae0447a0f
        type: model entry
        Unicast IP address list: [172.23.24.25]
        Multicast IP address list: [ ]
        D2D discovery_group_identifier list: [ ]
        expected_availability_time: 35
        expected_frequency_availability:
        memory_loading_offset: 0x0
        ],[
        chunk_id_number: 0
        checksum:
        df0120ef2aa0269dfc3504acv012ee028a78d002aa3f6958efcbb036210b0ae0447a0f
        type: model entry
        Unicast IP address list: [ ]
        Multicast IP address list: [224.0.1.x]
        D2D discovery_group_identifier list: [ ]
        expected_availability_time: 25
        expected_frequency_availability: 0.50
        memory_loading_offset: 0x0
        ],[
        chunk_id_number: 1
        checksum:
        87ad5ef6965dc236588b697a85002b0b365d6e978acc0214a254abb00a3df3645a87e
        type: regular intermediate chunk
        Unicast IP address list: [ ]
        Multicast IP address list: [ ]
        D2D discovery_group_identifier list: [1245582122]
        expected_availability_time: 5
```

-continued

```
        expected_frequency_availability:
        memory_loading_offset: 0x4C4B40
        ],[
        chunk_id_number: 2
        checksum:
        53ad3659ff55bb02458cfc36978aed001c2f235a5a5d6958aefc02bb3524dc0bb365d4
        type: regular intermediate chunk
        Unicast IP address list: [ ]
        Multicast IP address list: [ ]
        D2D discovery_group_identifier list: [1245582122]
        expected_availability_time: 6
        expected_frequency_availability: 0
        memory_loading_offset: 0xE4E1C0
        ],[
        chunk_id_number: 3
        checksum:
        ad369265cbb35201aad5248cbb25958aeff326e012a36cfb0245aedb36adc0215db0b
        type: final chunk
        Unicast IP address list:
        Multicast IP address list: [ ]
        D2D discovery_group_identifier list: [1245582122]
            expected_availability_time: 6
            expected_frequency_availability: 0
            memory_loading_offset: 0xE4E1C0
            ],[
            chunk_id_number: 3
            checksum:
            ad369262cbb35201aad5248cbb25958aeff326e012a36cfb0245aed36adc0215db0b
            type: final chunk
            Unicast IP address list: [ ]
            Multicast IP address list: [ ]
            D2D discovery_group_identifier list: [1245582122]
            expected_availability_time: 5
            expected_frequency_availability: 0
            memory_loading_offset: 0x1C9C380
            ]
            ] /* end of chunk list */
        ] /* end of second model description */
    ] /* end of model list */
```

Note:
The manifest file is required when the Manifest is an update, for example, when there is a model improvement or a new server address.

Various numeric values are used in the present application. The specific values are provided for example purposes and the aspects described are not limited to these specific values.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a video encoder, a video decoder or both, a radio frequency transceiver for use in a UE, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, or optical properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a GPU (Graphics Processing Unit), a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least." the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A. B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

It is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A method performed by a wireless transmit/receive unit (WTRU), comprising:
- receiving information indicating a plurality of network communication paths that are available for downloading an AI/ML model, wherein said information further includes AI/ML model information and indicates a communication mode and expected download time for each one of said plurality of network communication paths;
- determining a plurality of AI/ML model chunks for said AI/ML model based on said received information;
- determining one network communication path, from said plurality of communication network paths, to download a respective model chunk of said plurality of AI/ML model chunks of said AI/ML model, based on said received information;
- downloading said respective model chunk of said AI/ML model via said one network communication path;
- building at least a subset of said AI/ML model based on said respective model chunk of said AI/ML model; and
- performing inference on said at least a subset of said AI/ML model;
- wherein the receiving information is triggered by a change in an environmental condition at a live event, and wherein the information enables the WTRU to download an updated AI/ML model chunk corresponding to said change in the environmental condition.

2. The method of claim 1, wherein said communication mode includes at least one of unicast, multicast, and multicast carousel mode.

3. The method of claim 1, wherein said AI/ML model information includes at least one of a model identifier, a model size, a number of chunks for said AI/ML model, a model usage type, a model usage type extension, and an application time.

4. The method of claim 3, wherein said model usage type includes at least one of a full model type and an incremental model type.

5. The method of claim 3, wherein said model usage type extension includes at least one of a regular type, a specialization type, and an adaptive type.

6. The method of claim 1, wherein said AI/ML model information includes, for a model chunk, at least one of a chunk type, a chunk number, a chunk size, a checksum, an inference time, an expected availability time, an expected inference time, an expected download frequency availability, a memory footprint, and a memory loading offset used to indicate a location of said model chunk in a memory storing said AI/ML model.

7. The method of claim 1, wherein said information for a network communication path further indicates at least a network link type and a network address.

8. A method performed by a server, comprising:

receiving model subscription information for an event from a wireless transmit/receive unit (WTRU);

receiving an indication of a change in an environmental condition associated with the event;

in response to receiving said indication, selecting an updated AI/ML model chunk for the event corresponding to said change in the environmental condition;

generating information indicating a plurality of network communication paths that are available for downloading said updated AI/ML model chunk, wherein said information further includes AI/ML model information and indicates a communication mode and expected download time for each one of said plurality of network communication paths; and transmitting said generated information to said WTRU.

9. The method of claim 8, wherein said AI/ML model information includes, for a model chunk, at least one of a chunk type, a chunk number, a chunk size, a checksum, an inference time, an expected availability time, an expected inference time, an expected download frequency availability, a memory footprint, and a memory loading offset used to indicate a location of said model chunk in a memory storing said AI/ML model.

10. The method of claim 8, wherein said information for a network communication path further indicates at least a network link type and a network address.

11. A wireless transmit/receive unit (WTRU), comprising:

a receiver configured to receive information indicating a plurality of network communication paths that are available for downloading an AI/ML model, wherein said information further includes AI/ML model information and indicates a communication mode and expected download time for each one of said plurality of network communication paths; and one or more processor configured to:

determine a plurality of AI/ML model chunks for said AI/ML model based on said received information, determine one network communication path, from said plurality of communication network paths, to download a respective model chunk of said plurality of AI/ML model chunks of said AI/ML model, based on said received information, download said respective model chunk of said AI/ML model via said one network communication path, build at least a subset of said AI/ML model based on said respective model chunk of said AI/ML model, and perform inference on said at least a subset of said AI/ML model;

wherein the receiver is configured to receive information triggered by a change in an environmental condition at a live event, and wherein the information enables the one or more processor to download an updated AI/ML model chunk corresponding to said change in the environmental condition.

12. The WTRU of claim 11, wherein said communication mode includes at least one of unicast, multicast, and multicast carousel mode.

13. The WTRU of claim 11, wherein said AI/ML model information includes at least one of a model identifier, a model size, a number of chunks for said AI/ML model, a model usage type, a model usage type extension, and an application time.

14. The WTRU of claim 13, wherein said model usage type includes at least one of a full model type and an incremental model type.

15. The WTRU of claim 13, wherein said model usage type extension includes at least one of a regular type, a specialization type, and an adaptive type.

16. The WTRU of claim 11, wherein said AI/ML model information includes, for a model chunk, at least one of a chunk type, a chunk number, a chunk size, a checksum, an inference time, an expected availability time, an expected inference time, an expected download frequency availability, a memory footprint, and a memory loading offset used to indicate a location of said model chunk in a memory storing said AI/ML model.

17. The WTRU of claim 11, wherein said information for a network communication path further indicates at least a network link type and a network address.

18. A server, comprising:

a receiver configured to receive model subscription information for an event from a wireless transmit/receive unit (WTRU);

one or more processors configured to:

receive an indication of a change in an environmental condition associated with the event;

in response to receiving said indication, select an updated AI/ML model chunk for the event corresponding to said change in the environmental condition;

generate information indicating a plurality of network communication paths that are available for downloading said updated AI/ML model chunk, wherein said information further includes AI/ML model information and indicates a communication mode and expected download time for each one of said plurality of network communication paths; and a transmitter configured to transmit said generated information to said WTRU.

19. The server of claim 18, wherein said AI/ML model information includes, for a model chunk, at least one of a chunk type, a chunk number, a chunk size, a checksum, an inference time, an expected availability time, an expected inference time, an expected download frequency availability, a memory footprint, and a memory loading offset used to indicate a location of said model chunk in a memory storing said AI/ML model.

20. The server of claim 18, wherein said information for a network communication path further indicates at least a network link type and a network address.

* * * * *